(12) United States Patent
Kricorissian et al.

(10) Patent No.: US 7,304,290 B2
(45) Date of Patent: Dec. 4, 2007

(54) OPTICAL IMAGE READER HAVING A REPLACEABLE OPTICAL ARRAY PANEL

(75) Inventors: Gregg Kricorissian, Ottawa (CA); Xinjun Xie, Ottawa (CA); Tao Zhang, Ottawa (CA)

(73) Assignee: Psion Teklogix Systems Inc., Mississauga, Ontario (CA)

( * ) Notice: Subject to any disclaimer, the term of this patent is extended or adjusted under 35 U.S.C. 154(b) by 0 days.

(21) Appl. No.: 10/927,694

(22) Filed: Aug. 27, 2004

(65) Prior Publication Data

US 2006/0054779 A1    Mar. 16, 2006

(51) Int. Cl.
*H01J 3/14* (2006.01)
*H01J 40/14* (2006.01)
*H01J 5/16* (2006.01)
*H01J 5/02* (2006.01)

(52) U.S. Cl. .................. 250/216; 250/239; 359/507; 235/462.42

(58) Field of Classification Search ............... None
See application file for complete search history.

(56) References Cited

U.S. PATENT DOCUMENTS

| | | | |
|---|---|---|---|
| 5,920,061 A | 7/1999 | Feng | |
| 6,034,379 A | 3/2000 | Bunte et al. | |
| 6,371,374 B1 | 4/2002 | Schwartz et al. | |
| 6,431,452 B2 | 8/2002 | Feng | |
| 6,601,768 B2 * | 8/2003 | McCall et al. | 235/462.42 |
| 6,669,093 B1 | 12/2003 | Meyerson et al. | |
| 6,832,725 B2 * | 12/2004 | Gardiner et al. | 235/462.21 |

* cited by examiner

*Primary Examiner*—Georgia Epps
*Assistant Examiner*—Patrick J. Lee
(74) *Attorney, Agent, or Firm*—Pearne & Gordon LLP (57) ABSTRACT

The optical image reader is versatile since it can be assembled for use in a variety of reader applications, such as an ultra high definition reader, a high definition reader, a standard reader and an ultra long range reader. In addition to a housing enclosing an image sensor, an adjustable objective lens assembly for focusing an image of a target on the image sensor and a light source for illuminating and/or targeting the target, the reader includes a light shaping optical element array comprising optical elements assembled together as an integral unit and adapted to be fixed to the housing for shaping and directing light on the target. The optical elements are mounted on a panel, which is adapted to be fixed to the reader housing either permanently, or releasably to permit replacement of the panel on the housing. The method of assembling the image reader comprises the steps of selecting a light shaping optical element array from the variety of optical element arrays for the specific application, adjusting the objective lens assembly for optimum focal length for the specific application, and fixing the light shaping optical element array panel to the image reader housing. The present invention is further directed to a kit for an imaging system. The kit for an imaging system comprises an image reader mounted in a housing and one or more light shaping optical element array panels, each adapted to be releasably attached to the image reader housing.

33 Claims, 6 Drawing Sheets

OPTICAL IMAGE READER HAVING A REPLACEABLE OPTICAL ARRAY PANEL

FIELD OF INVENTION

The present invention relates generally to image capture devices and more particularly to the structure of the optical reader housing.

BACKGROUND OF THE INVENTION

The light shaping lens array of an image reader is comprised of a combination of prism lenses, cylindrical lenses and diffusers, which are used to shape and direct light onto a target. The lens array is positioned optically between the target and illumination light sources and embedded into the enclosure of the reader during the manufacturing stage and depending on the application, the array is adjusted in relation to the target and illumination light source and fixed in place. These applications vary with the type of symbology to be imaged and may include standard, high density or long range code reading.

This means that the image reader must be customized to provide different light shaping capabilities for each unique application. Further, depending on what application is needed and more specifically, what focal length is needed, the objective lens must be positioned over the image sensor and then fixed in place. Therefore, the adjustment of the light shaping lens array is in addition to the required adjustment of the objective lens.

U.S. Pat. No. 6,371,374 issued to Schwartz et al on Apr. 16, 2002, describes a manufacturing technique whereby the light shaping optical elements are adjusted until the desired distances from the illumination sources are obtained and then the elements are fixed in place. These adjustments are in addition to the adjustment of the objective lens in relation to the image sensor. The main drawback to this method therefore, is the need for numerous adjustments including to the light shaping optical elements and the objective lens.

U.S. Pat. No. 6,034,379 issued to Bunte et al on Mar. 7, 2000, describes a technique in which the illumination assembly of an image reader contains different types of illumination sources for different code reading applications. These sources are also replaceable. This technique would require that the illumination assembly be contained on its own circuit board, which would be removable from the image reader. While this technique does provide some flexibility in the amount of code reading applications the reader can be used with, it is an expensive and complex.

U.S. Pat. No. 6,601,768 issued to McCall et al on Aug. 5, 2003, discloses an optical plate of diffuser elements to diffuse light from the illumination assembly, which is snap-fitted into the frame of an image reader module. This invention however, does not disclose a technique whereby a different optical plate can by used for different code reading applications.

Therefore there is need for optical image readers capable of using various preassembled light shaping element arrays that meet the requirements of different applications

SUMMARY OF THE INVENTION

The present invention is directed to an image reader for use in a variety of reader applications. The reader includes a housing enclosing an image sensor, an adjustable objective lens assembly for focusing an image of a target on the image sensor and a light source for illuminating and/or targeting the target. The reader further includes a light shaping optical element array comprising optical elements assembled together as an integral unit and adapted to be fixed to the housing for shaping and directing light on the target, wherein the optical element array is any one of a group of arrays meeting the requirements of the variety of predetermined reader applications. The variety of predetermined reader applications may include an ultra high definition reader, a high definition reader, a standard reader and an ultra long range reader.

In accordance with a further aspect of the invention, the optical elements are mounted on a panel or molded into a panel, which is adapted to be fixed to the reader housing either permanently, or releasably to permit replacement of the panel on the housing.

In accordance with another aspect of the invention, the panel includes an aperture for receiving the objective lens assembly, and may include a collet associated with the aperture for securing the objective lens assembly.

In accordance with a specific aspect of the invention, the optical elements in the optical element array may be adapted to shape and direct light for illuminating the target, for targeting the target, or for both.

In accordance with another aspect of the invention, the optical element array panel may include an objective lens assembly having a predetermined fixed focus mounted to it.

The present invention is further directed to a method of assembling an image reader for a specific image reading application wherein the image reader has a housing enclosing an image sensor, an adjustable objective lens assembly for focusing an image of a target on the image sensor, a light source for illuminating and/or targeting the target, and a variety of light shaping optical element arrays each comprising optical elements mounted on a panel adapted to be fixed to the housing. The method comprises the steps of selecting a light shaping optical element array from the variety of optical element arrays for the specific application, adjusting the objective lens assembly for optimum focal length for the specific application, and fixing the light shaping optical element array panel to the image reader housing. The light shaping optical element array panel may be releasably fixed to the image reader housing and the variety of optical element arrays may include arrays that meet the requirements of an ultra high definition reader, a high definition reader, a standard reader and an ultra long range reader.

The present invention is further directed to a kit for an imaging system. The kit comprises an image reader mounted in a housing and one or more light shaping optical element array panels, each adapted to be releasably attached to the image reader housing.

In accordance with a specific aspect of the invention, the optical element array panels in the kit may be adapted to shape and direct light for illuminating the target, for targeting the target, or for both. Further the optical element array panels in the kit may include an array that meets the requirements of an ultra high definition reader, an array that meets the requirements of a high definition reader, an array that meets the requirements of a standard reader and/or an array that meets the requirements of an ultra long range reader.

In accordance with a further specific aspect of this invention, the kit may include an image reader comprising an image sensor, an objective lens assembly, and a targeting and/or illumination light source.

In accordance with another specific aspect of this invention, the panels may include an objective lens assembly having a fixed focus.

The present invention is further directed to an image reader housing comprising an aperture to accommodate a barrel of an objective lens assembly, a collet connector surrounding the aperture for releasable coupling with an optical element array wherein the optical element array has fingers for cooperating with the collet connector in a releasable manner.

The present invention is further directed to an optical element array panel comprising an optical element array for shaping and directing illumination and targeting sources and an objective lens assembly for focusing light at a predetermined focal length, wherein the optical element array and the objective lens assembly are assembled on the panel as an integral unit.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

The invention will be described with reference to the accompanying drawings, wherein.

DETAILED DESCRIPTION

For purposes of explanation, specific embodiments are set forth to provide a thorough understanding of the present invention. However, it will be understood by one skilled in the art, from reading this disclosure, that the invention may be practiced without these specific details. Moreover, well-known elements, devices, process steps and the like are not set forth in detail in order to avoid obscuring the scope of the invention described.

Figure 1:
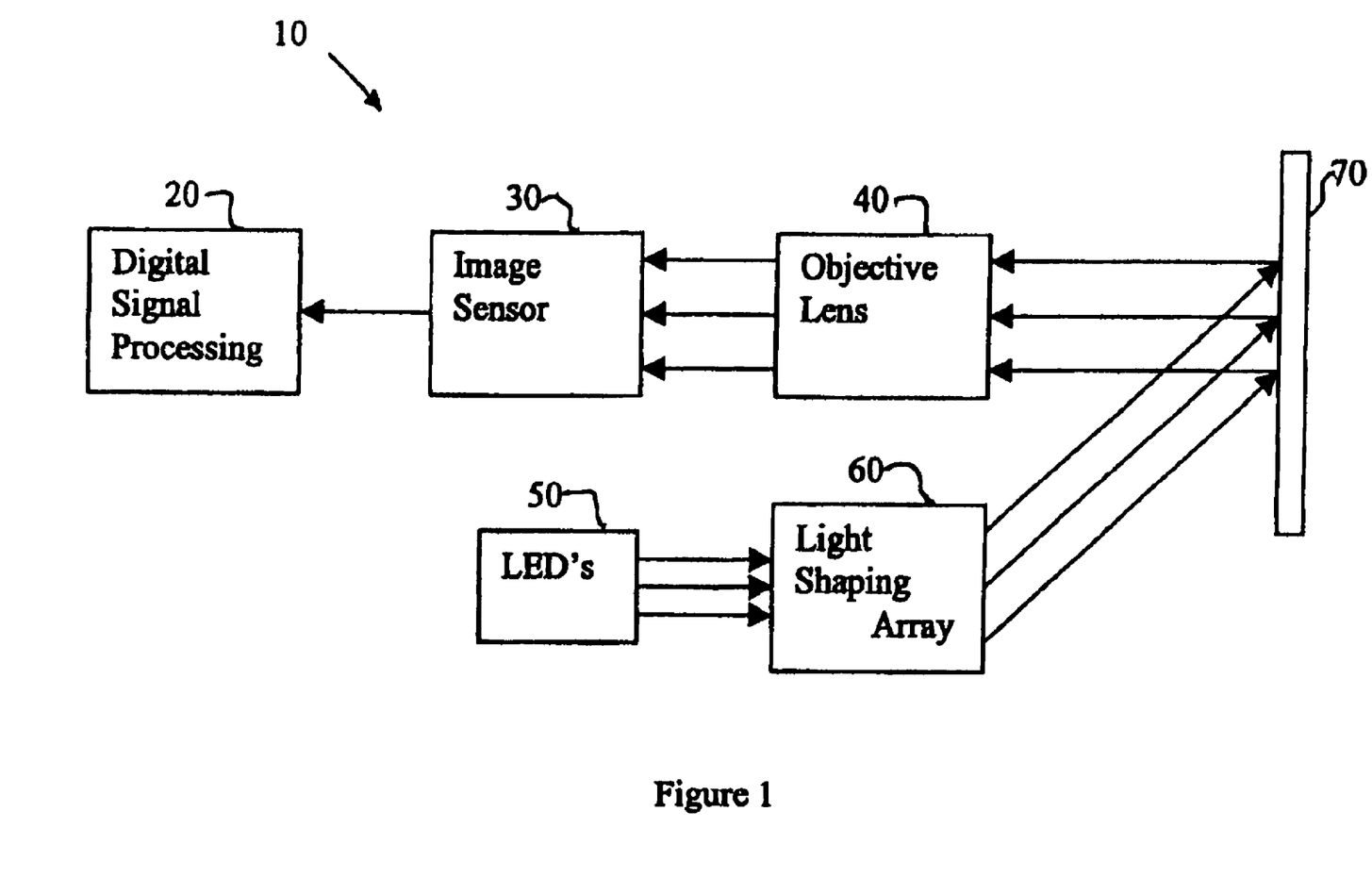
FIG. 1 is a functional block diagram representing an image reader of the present invention.

A functional block diagram illustrating a portion of a typical image reader 10, in which the present invention may be incorporated, is described with reference to FIG. 1. Image reader 10 comprises an image sensor 30, an objective lens assembly 40 positioned in front of the image sensor 30. Targeting and illumination light sources 50 for illuminating a target 70 such as a 1D or 2D bar code symbol, through a light shaping optical element array 60. The objective lens assembly 40 directs an image of the illuminated target 70 to the image sensor 30. The image data is digitally processed 20 such that an electrical output signal indicative of the image is produced. This digital image data may, for example, then be stored in memory and decoded.

The illumination and targeting light sources 50 may include a plurality of LED's. However, those skilled in the art will understand that different types of illumination sources, other than LED's may also be used without departing from the scope of the present invention. The light shaping optical element array 60 is positioned in front of the illumination and targeting assemblies in order to shape and direct the light onto the target 70 to be imaged.

The light shaping optical element array 60 is comprised of a combination of prism lenses, cylindrical lenses, diffusers or other optical elements used to shape, direct and focus light onto the target. In accordance with the present invention, optical element array 60 may be incorporated into the housing of the image reader 10 in a variety of ways. The entire optical element array 60 may be fixed, properly adjusted, into a single panel that fits onto the image reader housing; alternately, the optical element array 60 may include component elements individually mounted to that they can be assembled into a single unit properly adjusted for fitting onto the image reader housing in the final stages of manufacture.

Depending on the application of the image reader 10, an optical element array 60 must be adjusted in relation to the target 70 and illumination light source 50 and fixed in place to meet the requirements of the specific application, a different optical element array 60 containing different light shaping elements will be required for different applications. There are different types of cameras and code readers to image different symbologies. They include ultra high definition (UHD), high definition (HD), standard and ultra long range (ULR) readers. Each application requires a different focal length. This means that the objective lens 40 is positioned at a different distance from the image sensor 30 in each of these applications in order to provide for the different focal range. Similarly, each of these applications would require different illumination and targeting ranges, meaning that the light shaping optical element array 60 would need to be positioned at different distances in relation to the illumination and targeting sources 50, or the array 60 would require unique lens elements suited for the specific application. A different optical element array 60 may be needed for standard, high density or long range code reading applications, requiring the image reader 10 to be customized to provide different illumination and targeting capabilities for each unique application.

Further, as stated above, depending on what application is needed, the objective lens 40 must be positioned over the image sensor to provide a specific focal length, and then fixed in place. Therefore, the adjustment of the light shaping optical element array 60 is needed in addition to the required adjustment of the objective lens 40.

Figure 2A:
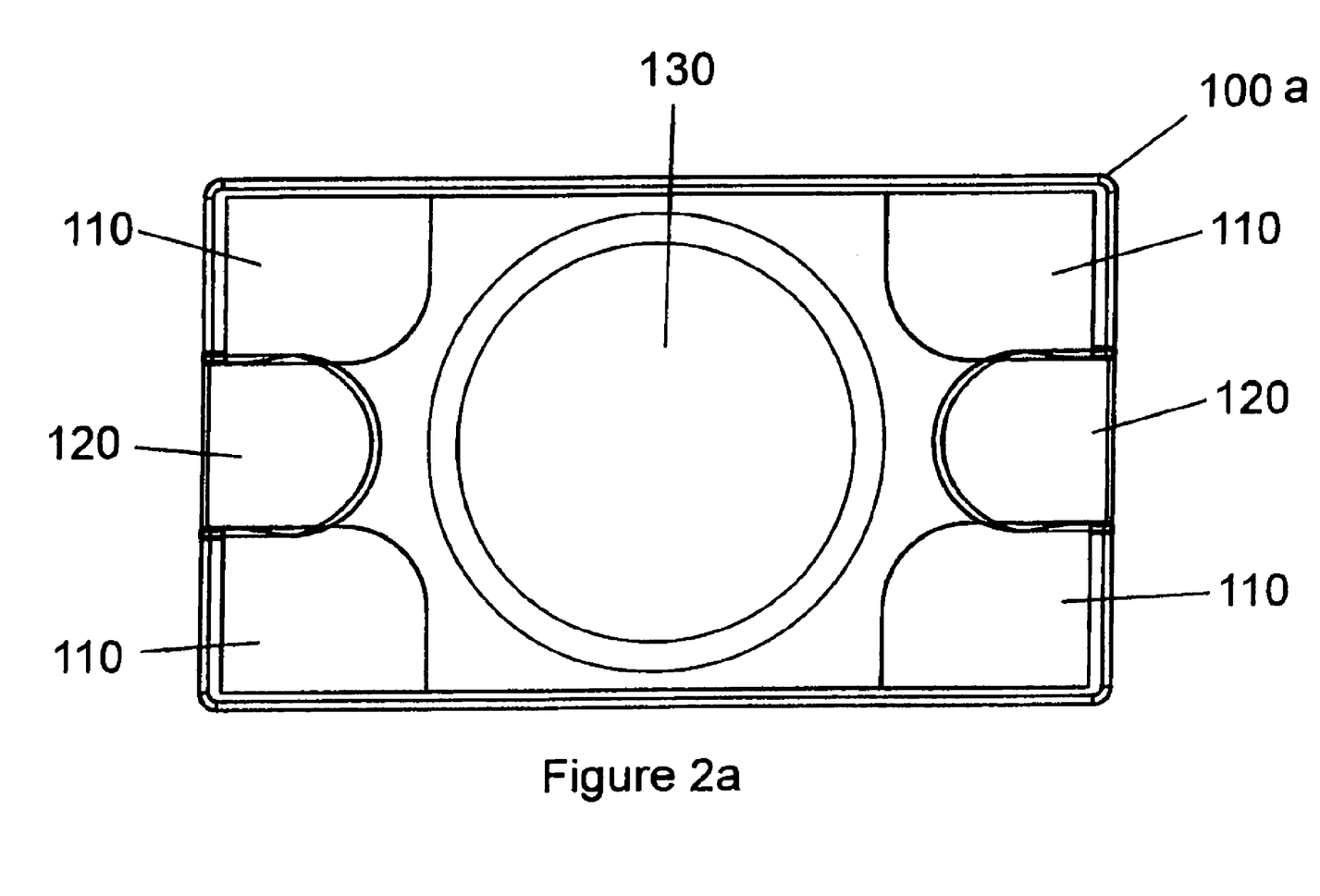
FIG. 2a is a top view of an embodiment of the optical element array panel of the present invention.
Figure 2B:
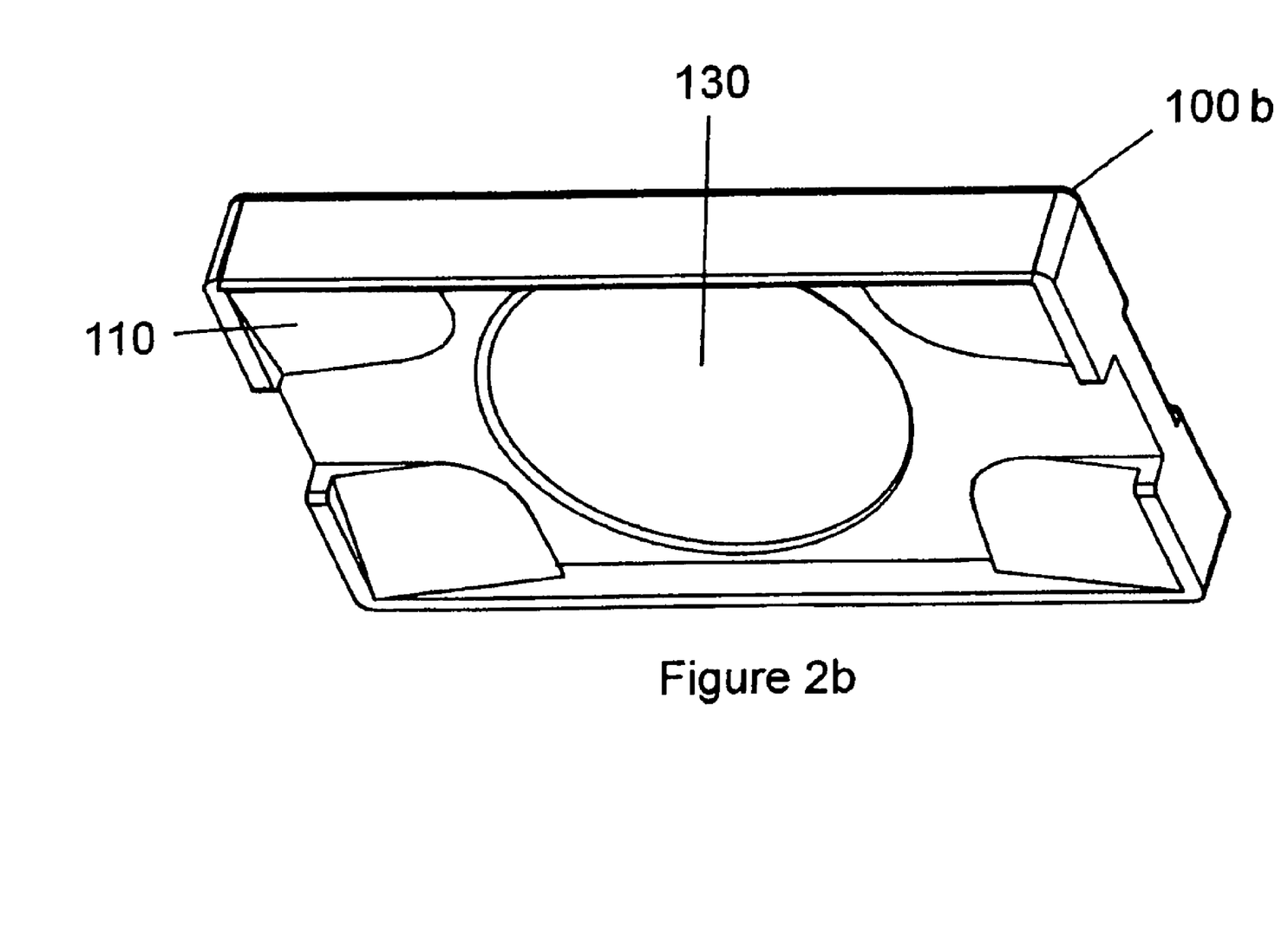
FIG. 2b is a bottom perspective view of another embodiment of the optical element array panel of the present invention.

In an embodiment of the present invention, as shown in FIG. 2a and 2b, the light shaping optical element array 60 is constructed as a single panel 100a, 100b containing all the required light shaping optical elements 110, 120. As shown in figure 2b, the array panel 100b contains only illumination optics 110 for directing light from source 50 to illuminate the target 70 to be imaged. Alternately, the array panel 100a in figure 2a, contains the illumination optics 110 as well as targeting optics 120, which shape, and direct light from source 50 onto the target 70 to be imaged. The targeting optics 120 direct the light emitted from the targeting light source 50, onto the target 70 of interest in order to guide the user to position the image reader 10 at an optimal angle and distance from the target 70.

The panel 100a, 100b could for example contain a combination of diffusers, prisms, cylindrical lenses or any other optical elements suitable for shaping, focusing and directing light from a light source 50 onto a target 70 to be imaged.

The illumination optics 110 and the target optics 120 are adjusted and fixed onto the panel 100a or 100b to form a unitary structure for mounting onto the image reader 10 housing. The optical element array panel 100 snaps into the image reader module in front of the illumination and targeting assemblies. Those skilled in the art will understand that a variety of optical elements could be used or combined in the optical element array panel 100a, 100b without departing from the scope of the invention. The panel 100a, 100b further contains an aperture 130 large enough to accommodate the objective lens assembly 40.

In accordance with the present invention, a different panel 100a, 100b may be produced for each application. The panels 100a, 100b may be mass-produced since specific optical elements in the illumination optics 110 and/or target optics 120 are built into the panel 100a, 100b such that they are adjusted for specific applications. Anyone of the panels 100a, 100b that have been constructed for different applications, may be affixed to an image reader 10 housing. In this way, identical image readers 10, except for panel 100a, 100b may be used for many different applications and the need to produce a different image reader 10 to accommodate each unique application is eliminated. For example, the same image reader 10 could be used for a standard symbology application and a long-range symbology application. All that would be needed is to fix the appropriate optical element array panel 100a, 100b onto the reader 10 housing and to adjust the objective lens 40 to the desired focal length.

The different optical element array panels 100a, 100b, when affixed to the image reader 10 housing, would already be pre-positioned at an optimum distance from the illumination and target light sources 50, in order to shape and direct light onto the target 70. The optimum distance would depend on the specific requirements of the image reader 10 based on the symbology to be imaged. The predetermined distances required for various applications may be achieved by mass-producing the optical element array panels 100a, 100b to be of a specific thickness, or by including different types of optical elements to shape and direct the light from the illumination source 50 in a specific way to match each application. In this way, the alignment of the light shaping optical element array 100a, 100b does not need to be adjusted at the final manufacturing stage, in relation to the illumination sources 50.

The optical element array panel 100a, 100b may also be designed to hold the objective lens assembly 40 in place. Depending on the application, the objective lens assembly 40 must be adjusted in relation to the image sensor 30. During the final manufacturing stage, the optical element array panel would be fixed to the reader 10 housing only once the objective lens assembly 40 is correctly aligned.

Figure 3A:
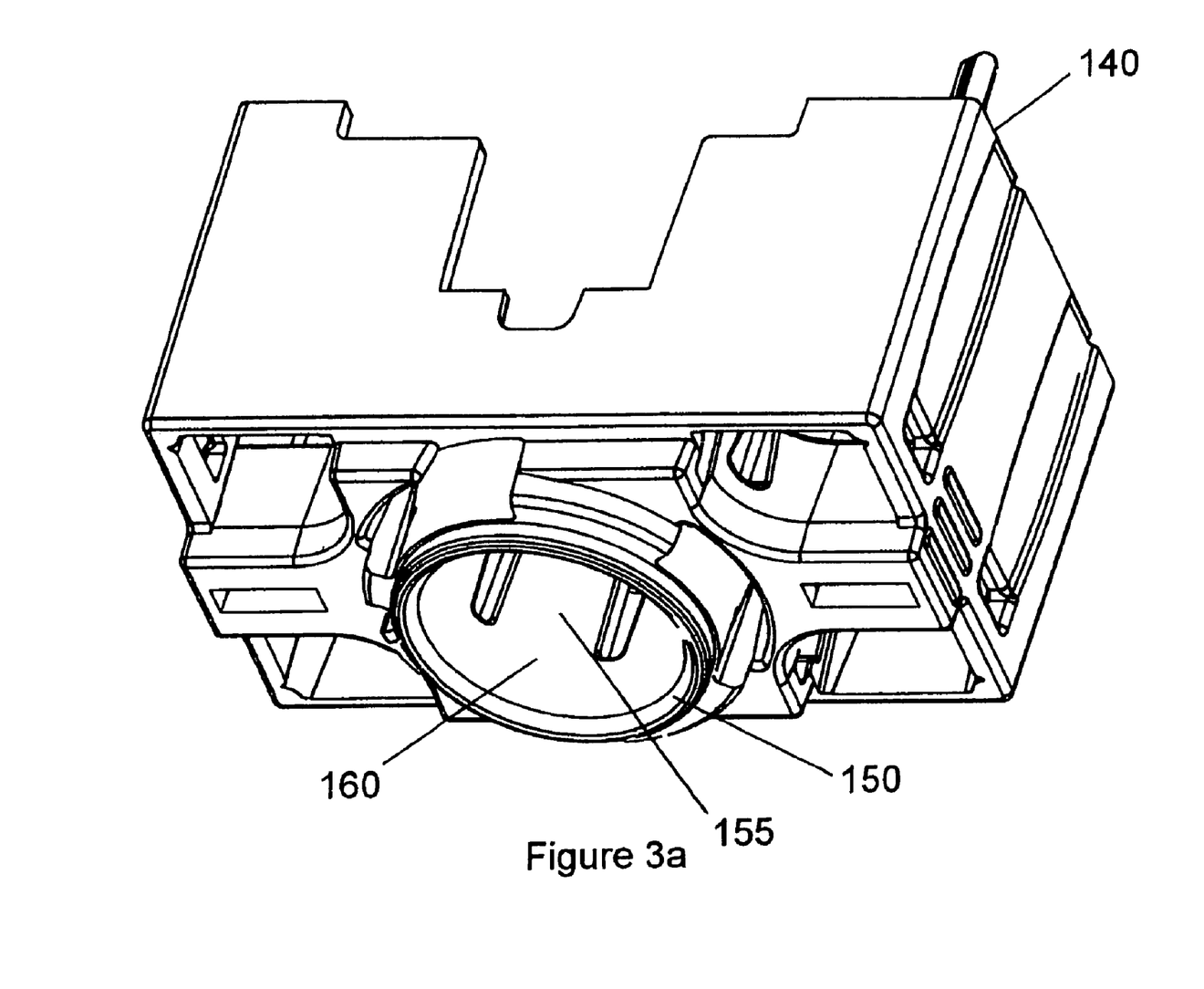
FIG. 3a is a perspective view of the main housing of the image reader of the present invention.
Figure 3B:
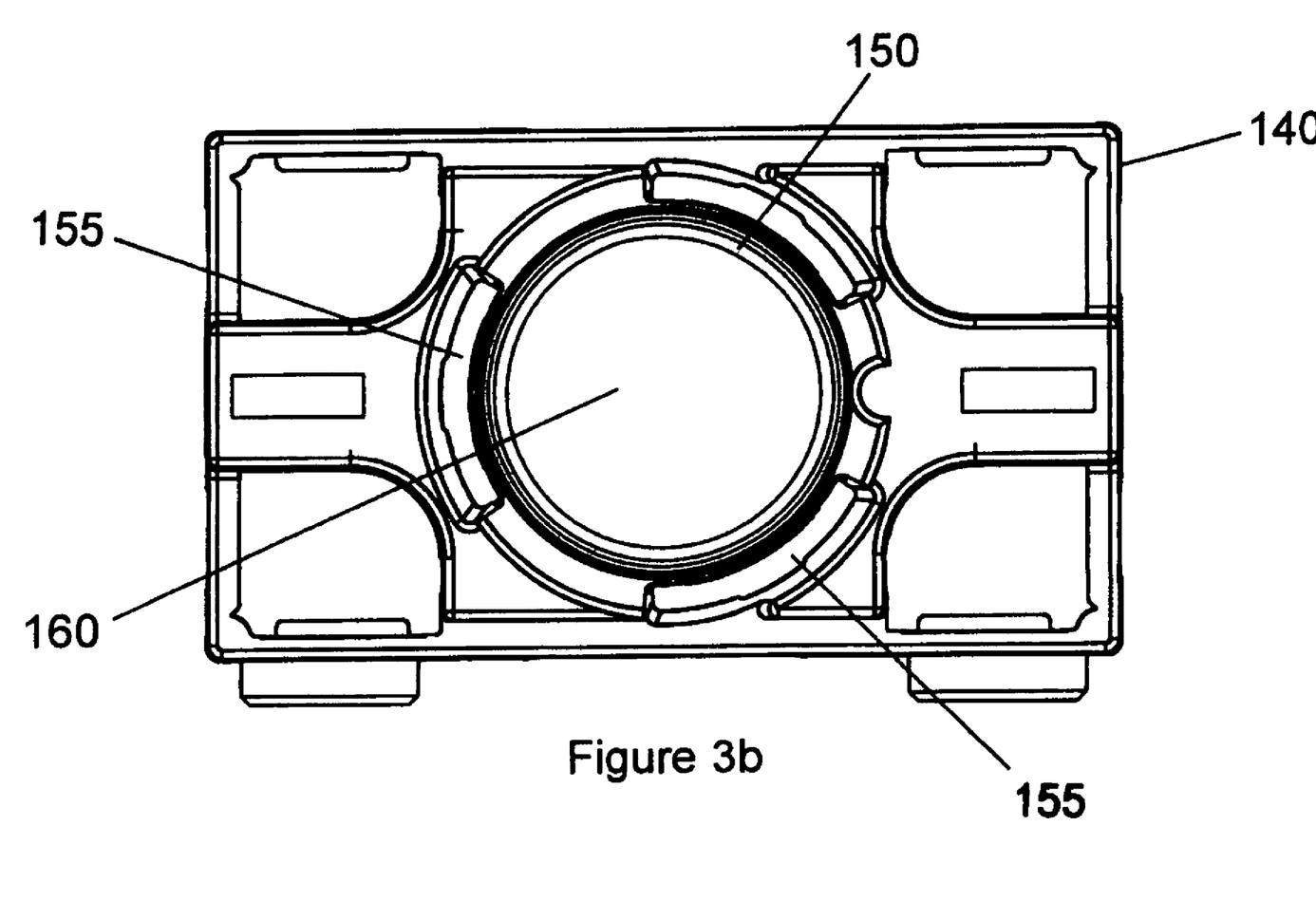
FIG. 3b is a top view of the main housing of the image reader of the present invention with a collet connector.

With reference to FIGS. 3a and 3b, which illustrate an embodiment of an image reader housing 140, the housing 140 includes an aperture 160 to accommodate the barrel of the objective lens assembly 40. The barrel of the objective lens assembly 40 slides through a collet connector 150 having a multi-fingered clamping mechanism in the image reader housing 140. At the edge of the aperture 160, a plurality of collet fingers 155 press against the outer surface of the objective lens assembly 40 barrel (not shown).

Figure 4:
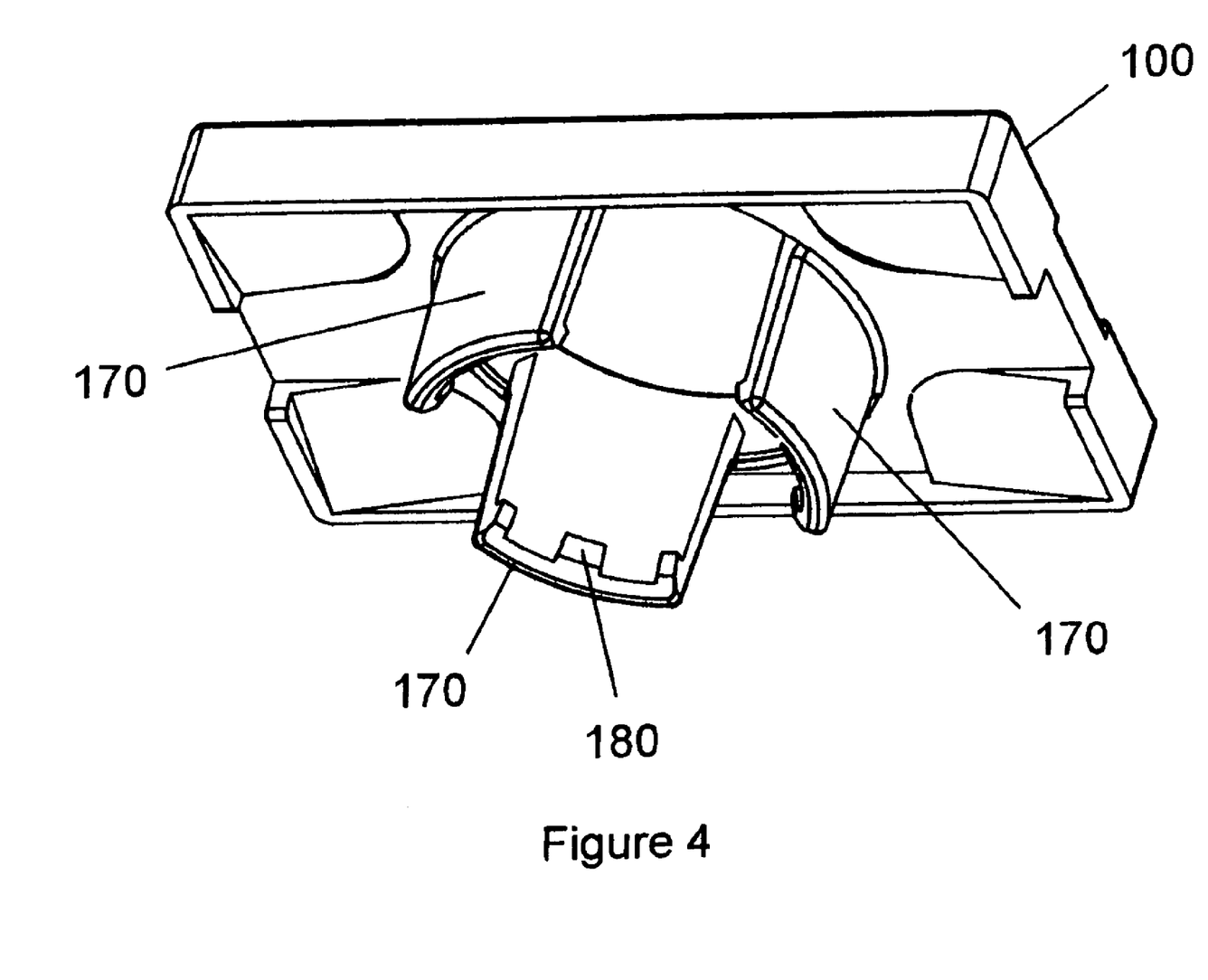
FIG. 4 is a bottom perspective view of another embodiment of the optical element array panel of the present invention with collet fingers.

With reference to FIG. 4, the optical element array panel 100 has a plurality of tapered fingers 170, each having a tab 180. Essentially, the fingers 170 on the optical element array panel 100 coincide with the collet fingers 155 on the housing 140. The tapered fingers 170 of the panel 100 slide over the collet connector 150 and bears on the collet fingers 155 in the housing 140. When a correct adjustment of the objective lens has been achieved and the setting is to be secured, the optical element array panel 100 is fixed onto the front portion of the housing 140 such that its fingers 170 compress the collet connector fingers 150 within the housing 140, so that they grip the objective lens assembly 40 barrel securely.

It should be noted by those skilled in the art that other mechanisms for securing the objective lens assembly 40 are possible. For example, a smooth objective lens assembly 40 barrel and multi-fingered collet connector 150 could be replaced by a threaded objective lens assembly 40 barrel and a split nut with a closing mechanism compressed by a detail in the light shaping optical element lens array panel 100.

Further it should be noted by those skilled in the art that there are many ways that the optical element array panel 100 may be fixed to the image reader housing 140. For instance, panel 100 may be glued to housing 140 or the panel 100 may be held by hooked snap details in fingers that would ride over and hook onto mating details in the main housing 140. Such arrangements would generally provide a permanent construction.

In another embodiment of the present invention, the optical element array panel 100 could be releasably snapped into the image reader housing 140 thereby making the light shaping optical element array panel 100 field replaceable. The user could simply replace the optical element array panel 100 with a different one depending on the application of interest. This may be possible with some simple modifications to allow access to the snap detail in the hooked snap molded into the optical element array panel fingers, or alternately the optical element array panel 100 could be held in place by screws or other such fasteners. With the hooks disengaged, the optical element array panel 100 may be easily withdrawn thereby permitting both the replacement of the optical element array panel 100 and the adjustment or replacement of the objective lens assembly 40, so that the desired field alteration can take place.

With the above-described embodiments, only a single adjustment of the objective lens assembly 40 is needed in order to customize the device for a particular application. This technique provides optimum flexibility at the final manufacturing stage without the drawbacks of previous methods requiring customized packaging or multiple adjustments.

In order to avoid the need to adjust the objective lens assembly 40 for a specific application, in certain situations, it may be preferable to fix an objective lens assembly 40 to the panel 100 as an integral unit such that it is properly focused for the specific application of the panel 100. In this way when a particular panel 100 in accordance with this embodiment is fixed to the image reader housing 140, the objective lens assembly 40 as well as the light shaping optical elements 110, 120 will satisfy the requirements of a particular application. Fine adjustment of the objective lens assembly 40 can be accomplished by allowing slight movement of the objective lens assembly relative to the imager unit.

In addition, the present invention provides the advantage that an image reader in an appropriate housing can be packaged in a kit with a number of optical element array panels which have been constructed for different application, such as, for example, an optical element array panel that meets the requirements an ultra high definition (UHD) reader, a high definition (HD) reader, a standard reader and/or an ultra long range (ULR) reader. A user could then attach the appropriate optical element array panel for a specific application to the image reader housing for imaging desired targets, rather then having to invest in a number of application specific image readers.

While the invention has been described according to what is presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. In an image reader having a housing enclosing an image sensor, an adjustable objective lens assembly for focusing an image of a target onto the image sensor and a light source for illuminating and/or targeting the target, an optical element panel adapted to be fixed to the housing, the optical element panel comprising:
    a light shaping optical element array of optical elements fixed on the panel as an integral unit for shaping and directing light onto the target; and
    a securing element including:
        a first aperture on the panel for receiving the objective lens assembly, the housing including a second aperture associated with the first aperture; and
        a plurality of first fingers integrated into the panel and extending from the first aperture, the plurality of first fingers releasably engaged with a plurality of second fingers extending from the second aperture of the housing by a snap engagement for securing the position of the objective lens assembly in the housing when the optical element panel is fixed to the housing, wherein the position of the objective lens assembly in the housing may be changed when the plurality of first fingers are not engaged with the plurality of second fingers.

2. An optical element panel as claimed in claim 1 wherein the plurality of second fingers includes collet fingers, the collet fingers associating with the plurality of first fingers.

3. An optical element panel as claimed in claim 2 wherein the plurality of first fingers include tapered fingers that coincide with the collet fingers for securing the objective lens assembly.

4. An optical element panel as claimed in claim 1 wherein the optical elements in the optical element array are adapted to shape and direct light for illuminating the target.

5. An optical element panel as claimed in claim 1 wherein the optical elements in the optical element array are adapted to shape and direct light for targeting the target.

6. An optical element panel as claimed in claim 1 wherein the optical elements in the optical element array are adapted to shape and direct light for illuminating and targeting the target.

7. A light shaping optical element array panel as claimed in claim 1, wherein the optical element array is any one of a group of arrays that meet the requirements of an ultra high definition reader, a high definition reader, a standard reader and an ultra long range reader.

8. An optical element panel as claimed in claim 1, wherein the plurality of first fingers are configured to slide over the plurality of second fingers and compress the plurality of second fingers.

9. An optical element panel as claimed in claim 8, wherein each of the plurality of first fingers includes a tab extending from the corresponding first finger inwardly into the first aperture.

10. In an image reader having a housing enclosing an image sensor, an adjustable objective lens assembly for focusing an image of a target onto the image sensor, a light source for illuminating and/or targeting the target and an optical element panel adapted to be fixed to the housing, the optical element panel comprising a light shaping optical element array of optical elements fixed on the panel as an integral unit for shaping and directing light onto the target, a method of assembling the image reader comprising the steps of:
    selecting an optical element panel comprising a securing element including a first aperture on the optical element panel for receiving the objective lens assembly and a plurality of first fingers integrated into the panel and extending from the first aperture for securing the objective lens assembly in the housing when the optical element panel is fixed to the housing;
    adjusting the objective lens assembly for optimum focal length for the specific reader; and
    releasably fixing the optical element panel to the image reader housing, including:
        sliding the plurality of first fingers over a connector of the housing, the connector of the housing including a second aperture and a plurality of second fingers extending from the second aperture; and
        engaging the plurality of the first fingers with the plurality of second fingers by a snap movement so that the plurality of first fingers compresses the plurality of second fingers, thereby securing the objective lens assembly in the housing.

11. A kit for an imaging system comprising:
    an image reader mounted in a housing for imaging a target; and
    a plurality of optical element panels, each of the optical element panels including:
        a securing element having:
            a first aperture on the optical element panel for receiving an objective lens assembly, and
            a plurality of first fingers integrated into the panel and extending from the first aperture, the plurality of first fingers being releasably engaged with a plurality of second fingers extending from a second aperture of the housing by a snap engagement for securing the objective lens assembly in the housing when the optical element panel is fixed to the housing; and
        a light shaping optical element array of optical elements fixed to the panel
    as an integral unit for shaping and directing light onto the target,
    each optical element panel being adapted to be releasably attached to the image reader housing.

12. A kit as claimed in claim 11 wherein the optical element panels are constructed to shape and direct light to illuminate the target.

13. A kit as claimed in claim 11 wherein the optical element panels are constructed to shape and direct light to target the target.

14. A kit as claimed in claim 11 wherein at least one of the optical element panels meets the requirements of an ultra high definition reader.

15. A kit as claimed in claim 11 wherein at least one of the optical element panels meets the requirements of a high definition reader.

16. A kit as claimed in claim 11 wherein at least one of the optical element panels meets the requirements of a standard reader.

17. A kit as claimed in claim 11 wherein at least one of the optical element panels include a panel that meets the requirements of an ultra long range reader.

18. A kit as claimed in claim 11 wherein the image reader comprises an image sensor, and a targeting and/or illumination light source.

19. A kit as claimed in claim 11, wherein the plurality of first fingers are configured to slide over the plurality of second fingers and compress the plurality of second fingers.

20. A kit as claimed in claim 19, wherein each of the plurality of first fingers includes a tab extending from the corresponding first finger inwardly into the first aperture.

21. An optical element panel for an image reader comprising:
   a light shaping optical element array of optical elements for shaping and directing sources of light; and
   a fixing element for assembling an objective lens assembly with the optical element array as an integral unit; the fixing element including:
      a first aperture on the panel for receiving the objective lens assembly; and
      a plurality of first fingers integrated into the panel and extending from the first aperture, the plurality of first fingers being releasably engaged with a plurality of second fingers extending from a second aperture of a housing for the image reader by a snap engagement for fixing the optical element panel to the housing thereby securing the objective lens assembly at a predetermined position in the housing.

22. An optical element panel as claimed in claim 21, wherein the first snap element comprises a plurality of fingers for releasably engaging a plurality of fingers extended from a second aperture on the housing of the image reader.

23. An optical element panel as claimed in claim 21, wherein the image reader comprises an image sensor for detecting light from the objective lens assembly, wherein the predetermined position of the objective lens assembly provides an appropriate focal length for focusing light onto the image sensor based on an intended function of the image reader.

24. An optical element panel as claimed in claim 23, wherein the intended function of the image reader is one of an ultra high definition reader, a high definition reader, a standard reader and an ultra long range reader.

25. An optical element panel as claimed in claim 21, wherein the first snap element comprises a plurality of first fingers associated with a plurality of second fingers extending from a second aperture of the housing, the plurality of first fingers being configured to slide over the plurality of second fingers and compress the plurality of second fingers.

26. An optical element panel as claimed in claim 25, wherein each of the plurality of first fingers includes a tab extending from the corresponding first finger inwardly into the first aperture.

27. A housing for an image reader comprising:
   a first aperture to accommodate a barrel of an objective lens assembly; and
   a connector surrounding the first aperture for cooperating with an optical element panel, the optical element panel including a second aperture for receiving the barrel of the object lens assembly, the connector including:
      a plurality of first fingers extending from the first aperture, the plurality of first fingers being releasably engaged with a plurality of second fingers extending from the second aperture of the optical element panel by a snap engagement to releasably secure the position of the objective lens assembly within the housing when the optical element panel is fixed to the housing.

28. The housing for an image reader as claimed in claim 27 further comprising means for accepting an image sensor for detecting light from the objective lens assembly.

29. The housing for an image reader as claimed in claim 28, wherein the position of the objective lens assembly provides an appropriate focal length with respect to the image sensor based on an intended function of the image reader.

30. The housing for an image reader as claimed in claim 29, wherein the intended function of the image reader is one of an ultra high definition reader, a high definition reader, a standard reader and an ultra long range reader.

31. The housing for an image reader as claimed in claim 27, wherein the plurality of first fingers comprise a plurality of collet fingers,
   the plurality of second fingers cooperating with the plurality of collet fingers through the snap engagement.

32. A housing as claimed in claim 27, wherein the plurality of second fingers are configured to slide over the plurality of first fingers and compress the plurality of first fingers.

33. A kit as claimed in claim 32, wherein each of the plurality of second fingers includes a tab extending from the corresponding second finger inwardly into the second aperture.

* * * * *

UNITED STATES PATENT AND TRADEMARK OFFICE
CERTIFICATE OF CORRECTION

PATENT NO. : 7,304,290 B2  Page 1 of 1
APPLICATION NO. : 10/927694
DATED : December 4, 2007
INVENTOR(S) : Kricorissian et al.

It is certified that error appears in the above-identified patent and that said Letters Patent is hereby corrected as shown below:

In Column 4, Line 23, delete "application," and insert -- application; --, therefor.

In Column 8, Lines 54-55, in Claim 11, delete "as an integral............target," and insert the same at Line 53 after "panel".

In Column 9, Line 8, in Claim 17, delete "panels include a panel that" and insert -- panels --, therefor.

Signed and Sealed this
Ninth Day of April, 2013

Teresa Stanek Rea
*Acting Director of the United States Patent and Trademark Office*